March 10, 1970    J. F. ZIEVERS ET AL    3,499,535
FILTER LEAF
Filed Jan. 25, 1967    2 Sheets-Sheet 1
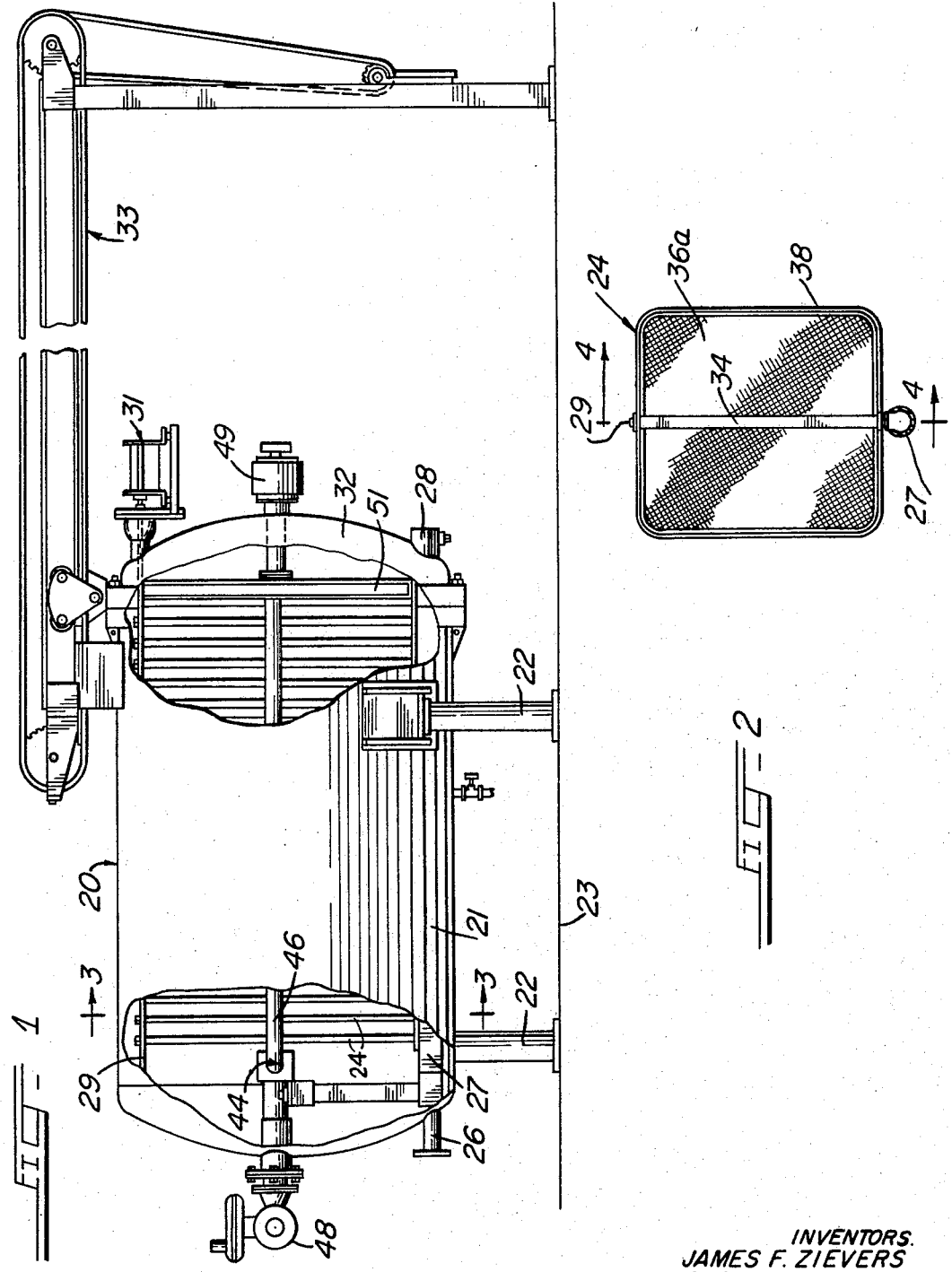
INVENTORS.
JAMES F. ZIEVERS
CLAY W. RILEY

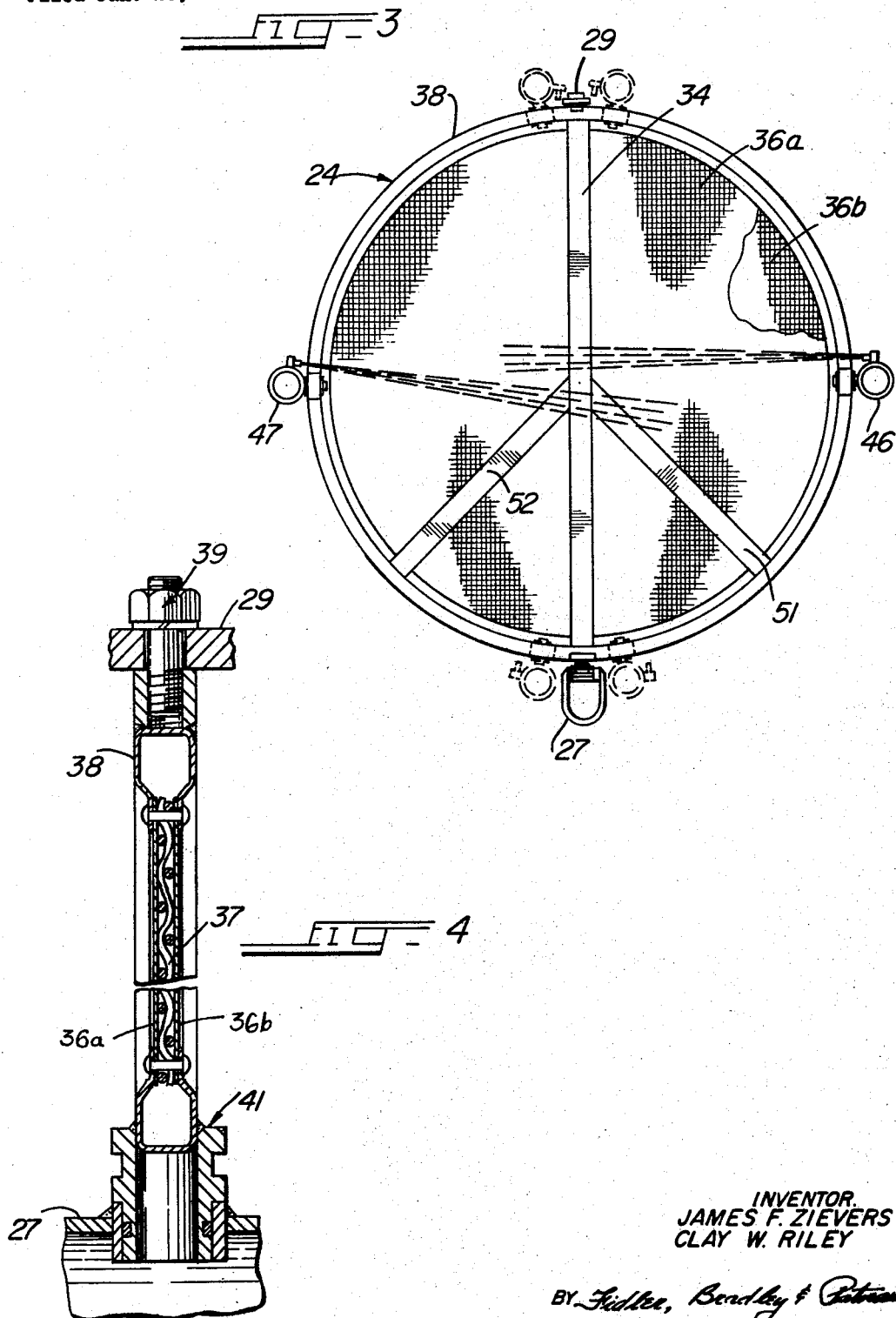

United States Patent Office 3,499,535
Patented Mar. 10, 1970

3,499,535
FILTER LEAF
James F. Zievers and Clay W. Riley, La Grange, Ill., assignors to Industrial Filter & Pump Mfg. Co., Cicero, Ill., a corporation of Illinois
Filed Jan. 25, 1967, Ser. No. 611,642
Int. Cl. B01d 23/04
U.S. Cl. 210—332                             8 Claims

ABSTRACT OF THE DISCLOSURE

The faces of filter leaves, which are adapted to be spatially arranged in a filter for removing particles from a liquid as the liquid passes through the filter leaves, are each provided with a substantially imperforate strip for preventing the adherence of filter cake thereat so that the filter cake is pre-crazed in a predetermined manner. For purposes of cake removal, an impacting device vibrates the leaves to dislodge the filter cake, whereby the filter cake separates along the preselected, weakened area into separate sheets and each sheet falls downwardly into a receptacle without contacting any of the component parts of the filter located adjacent to the leaves.

---

The present invention relates in general to filter leaves, and it more particularly relates to filtering apparatus having a plurality of spatially arranged pressure filter leaves. Filtering apparatus of the type with which the present invention may be employed generally comprises a pluraliy of spatially arranged, hollow filter leaves connected to a common outlet manifold. The leaves, which are perforate, are supported within a hermetically sealed tank and the liquid to be filtered is pumped into the tank under pressure. As the liquid passes through the leaves into the outlet manifold, the particles to be removed from the liquid are forced against the filter leaves or against a porous precoat layer previously built up thereon, and being too large to penetrate the precoat layers and/or the leaves themselves, the particles are deposited on the perforate faces of the filter leaves. The particles which are thus removed from the liquid form a porous filter cake which must be removed from the leaves when it becomes sufficiently thick to interfere with the efficient operation of the filter.

Inasmuch as the effluent passes through the cake during actual use of the filter, when the filtering apparatus is initially shut down for cleaning, the cake is moist or wet and can be removed in this wet state in many ways such, for example, as by spraying a liquid stream against the cake or by reversing the flow of liquid through the chamber. In this manner, the cake is broken up and suspended in a liquid before it is discharged from the chamber. This is called a wet discharge cake removal. In many situations, such, for example, as where the cake is highly toxic, it is desirable, if not necessary, to remove it from the tank in a relatively dry state. This is called a dry cake discharge.

This invention is particularly concerned with the cleaning by means of a dry cake discharge, of filter leaves of the type which comprise an externally grooved core member or other suitable supporting frame which is covered with a fabric bag, a fine mesh screen or other suitable material. During normal use, the effluent passes through the fine mesh material into the grooves of the core and then into an outlet manifold to which a plurality of such leaves are similarly connected. Accordingly, the filter cake is deposited on the outside surface of the leaf which must be removed from the leaf at periodic intervals.

In the past, a vibrator has been connected to the filtering apparatus to supply vibrating forces to the filter leaves whereby the filter cake is dislodged from each filter leaf in a single sheet. The filter cake would thereupon fall from the filter leaves into a receptacle. However, upon falling from the surfaces of the leaves, the sheets of the filter cake would fall onto the exhaust manifold and in some cases against certain parts of the filter apparatus located adjacent to the filter leaves. As a result, some of the filter cake would adhere to various parts of the filter including the outlet manifold, and it was necessary to subsequently remove the accumulated filter cake by other means such, for example, as by scraping the accumulated filter cake therefrom. In an attempt to prevent the accumulation of dislodged cake on the outlet manifold, baffles were mounted thereon, but because the filter cake would adhere to the baffles, this approach was not entirely successful.

Therefore, it is an object of the present invention to provide a new and improved filter leaf which, upon dislodging a filter cake therefrom, prevents the falling dislodged filter cake from contacting any component part of the filtering apparatus located adjacent to the filter leaf.

Another object is to provide a new and improved filtering apparatus that enables the time for removal of the filter cake to be substantially decreased.

Briefly, the above and further objects are realized in accordance with the present invention by providing a filter leaf having one or more substantially imperforate, elongated strips extending along the faces thereof. Since the filter cake does not adhere to the imperforate portion, the filter cake is thus provided with preselected, weakened areas for pre-crazing the filter cake. Consequently, when the filter cake is dislodged by impacting the leaves, the cake breaks apart along the preselected areas into a plurality of separate sheets of filter cake that fall into a receptacle without first contacting the adjacent component parts of the filtering apparatus. In order to direct the path of the fall of the dislodged sheets of filter cake in the above-described manner, the orientation of the imperforate portion is preselected with respect to the location of the adjacent component parts of the filter to cause the filter cake to separate into a given number of portions, each portion having a preselected shape to provide it with a preselected center of gravity.

The invention, both as to its organization and method of operation, together with further objects and advantages thereof, will best be understood by reference to the following detailed description taken in connection with the accompanying drawings, wherein:

FIGURE 1 is a side elevational view of a filter, having certain portions of the filter tank broken away to show the internal elements of the filter in which the filter leaf construction of the present invention may be employed;

FIGURE 2 is a side elevational view of a filter leaf constructed in accordance with the principles of the present invention;

FIGURE 3 is a side elevational view of another form of a filter leaf including certain principles of the present invention; and FIGURE 4 is a cross-sectional view of one of the filter leaves taken substantially along the line 4—4 of FIG. 2.

Referring now to the drawings and more particularly to FIG. 1 thereof, there is shown a horizontal type multiple pressure leaf filter, generally indicated by the numeral 20 in which the present invention may be employed. Such a filter is disclosed in detail in U.S. Patent No. 3,285,417. However, it should be understood that this filter is disclosed herein only by way of example, and that the present invention may be successfully employed in many other different types of filters.

The filter 20 includes a horizontally extending tank 21 and employs a plurality of vertically disposed hollow filter leaves 24. The influent, the liquid to be clarified, flows under pressure into the hermetically sealed tank 21 via an inlet 26, and then flows from the filter chamber into the cavities in the leaves 24. Each leaf is provided with a filter cake for facilitating the filtering of the influent, whereby the filter cake and the porous filter leaves provide the necessary filtering action. The filtered liquid passes from the cavities within each leaf 24 to an outlet manifold 27, which supports the leaves, and thence to an outlet conduit 28 for discharge of the clarified liquid from the tank 21.

After a maximum desirable amount of the filter cake has accumulated on the filter leaves, the cake may be removed from the leaves by impacting them in accordance with the dry cake discharge process. For this purpose, a conventional reciprocatory impacting device, generally indicated at 31, vibrates a bar 29, which is connected to the top portion of each of the leaves 24. A high speed reciprocatory impacting device, which may be used as the impacting device 31, is disclosed in U.S. Patent No. 3,212,643. In order to facilitate removal of the filter cake from the filter leaves, the leaves 24 can be removed from within the chamber of the tank 21 by opening a removable end cover 32 of the tank 31, and operating a sprocket and track assembly, generally indicated at 33, to move the leaves 24, together with the manifold 27 and impacting bar 29, out of and away from the tank 21.

By impacting the leaves with the impacting device 31 in accordance with the method described in detail in U.S. Patent No. 3,212,643, the filter cake can be dislodged from each of the leaves in a unitary mass or sheeet, which drops downwardly away from the leaves. Where the prior art type of filter leaf is used, the sheets of filter cake fall under the force of gravity onto the outlet manifold 27, and other adjacent parts of the filter apparatus as hereinafter described, and thence into a receptacle. Therefore, some of the filter cake, which in many cases is sticky, accumulates on the outlet manifold 27 and other adjacent parts of the filter apparatus, whereby other means are required to remove the accumulated discharged filter cake.

To prevent this unwanted accumulation of the discharged filter cake, each filter leaf, as shown in FIGS. 2 and 3, is provided with a means for preventing the accumulation of filter cake at a preselected area of the filter leaf to pre-craze the filter cake so that upon dislodging the filter cake from the filter leaves, the sheet of filter cake separates at the preselected area into a plurality of separate sheets. In accordance with the invention, any means may be employed which forms a substantially-imperforate strip extending along the face of the leaf to prevent the build-up of filter cake thereat, and which can be located in a preselected orientation. In order to prevent the falling sheets of dislodged filter cake from contacting certain parts of the filter before entering the receptacle, the location of the imperforate strip is preselected in relation to the location of the component parts of the filter adjacent to the filter leaves, whereby each separate sheet has a preselected shape to provide it with a preselected center of gravity for directing the path of its descent away from the adjacent component parts.

As shown in FIG. 2, a vertically disposed imperforate strip 34 extends along the faces of each filter leaf 24 above the outlet manifold 27 for the purpose of preventing the filter cake from adhering to the filter leaf along a narrow vertically-disposed area directly above the outlet manifold so that when vibrated the dislodged filter cake separates into two separate sheets which fall away to the sides of the manifold. Without such a vertically disposed imperforate member, the center of gravity of the sheet of filter cake is located above the outlet manifold 27, and therefore the dislodged sheet of filter cake falls directly onto the manifold 27 and accumulates thereon. With the imperforate portion or strip 34, the location of center of gravity of each of the two separate sheets of filter cake is located at a distance away from the vertical central axis of the filter leaf so that each of the two separate sheets falls on opposite sides of the manifold 27 without contacting it.

The imperforate strip 32 may be a plastic tape having an adhesive backing, or where a non-toxic material is required such as in the food industry, the strip 32 may be composed of stainless steel. There are many other possible techniques for providing the imperforate portion along the filter leaf, such, for example, as providing a substantially-imperforate member inside the cavity of the filter leaves, or applying paint or other material to a preselected portion of the porous filter leaf to block selected openings therein, or any other means located within or without the filter leaf for preventing the influent from passing to the inner cavity of the filter leaf.

Considering the construction of each filter leaf in greater detail, as shown in FIG. 2, each filter leaf may be rectangular in shape, or as shown in FIG. 3, each leaf may be circular in shape. Each filter leaf includes a pair of screens 36a and 36b, as best illustrated in FIG. 3. As shown in FIG. 4, the screens 36a and 36b are maintained in spaced relation by a frame or core composed of a course wire screen or grid 37 and an annular rim 38 which encompasses the spaced screens 36a and 36b. As described in greater detail in the above-mentioned Patent No. 3,212,643, and as shown in FIG. 4, each filter leaf is secured to the impactor bar 29 by means of a nut and bolt assembly generally indicated at 39, and the outlet manifold 27 is connected in sealing engagement with the leaf 24 for communication therewith by means of a bushing assembly generally indicated at 41. As best illustrated in FIG. 4, the manifold 27 thus supports both the leaves 24 and the impactor bar 29.

Another component part of the illustrated filtering apparatus which is located adjacent to the filter leaves and which should be avoided by the falling dislodged filter cake, is a sluicing assembly generally indicated at 44 in FIG. 1. The sluicing assembly 44 is employed in the filter 20 so that a wet discharge cake removal process may be used where desirable and includes a pair of horizontally extending conduits 46 and 47, best illustrated in FIG. 3, which extend along opposite sides of the filter leaves 24. As described in the above-mentioned Patent No. 3,285,417, the sluicing assembly sprays a sluicing fluid, such as water under pressure, onto the filter leaves 24 for the purpose of removing the filter cake in accordance with the wet discharge removal process. The water under pressure is supplied to the sluicing assembly 44 by means of a solenoid control valve 48. In order to oscillate the sluicing headers 46 and 47 during a sluicing operation, an oscillatory drive unit 49 is mounted on the cover 32 externally thereof and is connected to the headers 46 and 47 by means of a bar 51. The oscillatory actuator unit 49 may be identical to the oscillatory actuator unit 77 described in detail in U.S. Patent No. 3,240,338. If the sluicing assembly 44 is employed in accordance with the circular filter leaf of FIG. 3, it is desirable to have each of the headers 76 and 77 oscillate between a position adjacent the impactor bar 29 and a position adjacent the outlet manifold 27, as shown in dotted lines.

While not in use, it is desirable to maintain the headers 46 and 47 in substantially the same horizontal plane, as shown in the full lines in FIG. 3. In such a situation, if the cake were precrazed only along the vertical axis, the two sheets of dislodged filter cake would fall against the headers 46 and 47.

For the purpose of preventing the filter cake from contacting the sluice headers or the outlet manifold 27, as shown in FIG. 3, there is provided on each face of the leaf a pair of relatively narrow imperforate strips 51 and 52. In order to direct the path of the fall of the dislodged sheets of filter cake into the space between each of the headers 46 and 47 and the outlet manifold 27, the orientation of the transverse strips 51 and 52 is preselected whereby the transverse strips extend along the surface of the screen 36a from the approximate mid-point of the vertical strips 34 to each of the headers 51 and 52 at an angle of approximately 45 degrees from the outlet manifold 27.

The strip 34 causes the sheet of filter cake to separate into two separate sheets, and the strips 51 and 52 further divide the two sheets into four separate sheets. Due to the orientation of the transverse strips 51 and 52 as shown in FIG. 3, the shape of the upper and lower side sheets of filter cake, on either side of the manifold 27, causes each of them to have a preselected center of gravity for enabling them to drop between the corresponding sluice header and the outlet manifold 27. Since the center of gravity of two lower sheets is located at a distance away from the vertical axis of the filter leaf, the two lower side sheets drop along opposite sides of the manifold 27 without contacting it. Each of the upper side sheets has a center of gravity located in the upper portion thereof to cause it to fall downwardly and rotate toward the manifold 27 and away from the nearest sluice header, whereby each of the two upper sheets of filter cake avoid contacting either the manifold 27 or the sluice headers 46 and 47.

For the best separation of the filter cake along the precrazed portion of the cake in a sugar refining process, we have found that the width of the vertical strip 34, and of each of the transverse strips 51 and 52 should be about 80 percent of the maximum desirable depth of the filter cake.

Therefore, it is readily apparent that we have provided, in accordance with the present invention, a new and improved filter leaf, and a method and apparatus in connection therewith, which is so constructed that upon dislodging sheets of filter cake therefrom for cleaning purposes, the sheets of filter cake fall downwardly into a receptacle without first contacting the various different component parts of the filter located adjacent to the filter leaf. For his purpose, the filter cake formed on the face of the filter leaf is provided with preselected, weakened elongated areas for precrazing the filter cake. Consequently, upon impacting the leaf, the filter cake breaks apart along the preselected areas into a plurality of separate sheets of filter cake, each sheet having a preselected shape and therefore a preselected center of gravity, whereby the path of descent of each separate sheet is directed away from the adjacent component parts of the filter in a predetermined direction. In order to form the preselected weakened areas in the filter cake, one or more substantially imperforate strips are provided which extend along the faces of the filter leaf in a predetermined orientation in relation to the location of the various adjacent component parts of the filter, and which prevent the filter cake from adhering thereto.

While the present invention has been described in connection with particular embodiments thereof, it will be understood that many changes and modifications of this invention may be made by those skilled in the art without departing from the true spirit and the scope thereof. Accordingly, the appended claims are intended to cover all such changes and modifications as fall within the true spirit and scope of the present invention.

What is claimed is:
1. A filter leaf for filtering entrained solids from a liquid passed therethrough, comprising
 a generally planar core member,
 a circumferential rim surrounding the periphery of said core,
 an outlet conduit connected to said rim and communicating with said core,
 a pair of cake supporting sheets respectively overlying the opposite faces of said core, each sheet overlying substantially the entire face of the core,
 said sheets being formed of a perforate material through the perforations of which a liquid filtrate may flow to leave entrained solids on the outer surfaces of said sheets in the form of porous filter cakes, and
 means secured to said sheets for plugging strips of perforations in said sheets to prevent the flow of said filtrate through said sheets at the locations of said strips,
  said strips extending substantially from one to another of the edges of said core,
 whereby vibration of said leaf to remove filter cakes deposited on said sheets vibrates said sheets and causes said cakes to separate along the lines of said strips into a plurality of separate cake sections and fall from said leaf.

2. The filter leaf according to claim 1, wherein said strip comprises a relatively narrow strip having a width of approximately 80% of the maximum desirable thickness of said filter cake.

3. The filter leaf according to claim 1, wherein said strip comprises a relatively narrow strip disposed in a substantially vertical direction and extending from approximately the top portion of said core to approximately the bottom portion thereof.

4. The filter leaf according to claim 1, wherein said strips extend from the central portion of said core to a marginal edge of the right-hand portion of the core and disposed at an angle of approximately 45° with respect to the horizontal mid-plane of the core, and further including means plugging second strips of said sheets extending from said central portion of said core to another marginal edge of the left-hand portion of the core and disposed at an angle of approximately 45° with respect to the horizontal mid-plane of the core.

5. The filter leaf according to claim 4, further including means plugging third strips of said sheets extending from approximately the top portion of said core to approximately the bottom portion thereof and disposed in a substantially vertical direction.

6. The filter leaf according to claim 5, wherein each of said strips has a width of approximately 80% of the maximum desirable thickness of said filter cake, and said means are composed of stainless steel.

7. The filter including a leaf according to claim 5, further including a pressure tank enclosing a filter chamber, an effluent exhaust manifold supported by said tank in said filter chamber, said manifold being connected to the lowermost portion of said filter leaf, said third strip causing each of said separate sheets to have a preselected shape so that each of said separate sheets has a preselected center of gravity to cause it to fall under the force of gravity while avoiding contact with said manifold, and a pair of sluice headers mounted adjacent to said filter leaf on opposite sides thereof to spray a fluid under pressure onto the filter cake, said first and second strips causing each of said separate sheets to have a preselected shape so that each of said separate sheets has a preselected center of gravity to cause it to fall under the force of gravity while avoiding contact with said slucing headers.

8. Filtering apparatus having a plurality of pressure type hollow filter leaves each including a rigid frame and a porous filtering sheet secured across said frame for having a filter cake deposited thereon, said leaves being mounted in a pressure tank and being secured in face-to-face relationship to an effluent exhaust manifold with the cavities in said leaves being in communication with an outlet passageway in said manifold, said apparatus including a vibrator for imparting vibrational waves to said leaves to cause vibration of each said porous filtering sheet to dislodge the filter cake therefrom, the improvement residing in:
 means on a preselected location on each of the filtering sheets for causing the filter cake deposited thereon to have an elongated, weakened area in the preselected location of said means so that upon dislodging the filter cake from said leaves, the filter cake breaks apart along said weakened area into a plurality of separate sheets.

References Cited

UNITED STATES PATENTS

| 2,691,445 | 10/1954 | Eickemeyer | 210—486 X |
| 2,916,144 | 12/1959 | Langnickel | 210—486 X |
| 3,240,338 | 3/1966 | Schmidt et al. | 210—332 X |
| 3,285,417 | 11/1966 | Schmidt et al. | 210—81 |

SAMIH N. ZAHARNA, Primary Examiner

U.S. Cl. X.R.

210—346